R. H. UTZ & H. F. GRAHL.
HOSE COUPLING.
APPLICATION FILED AUG. 16, 1909.

1,011,284.

Patented Dec. 12, 1911.

2 SHEETS—SHEET 1.

Witnesses
Oliver W. Holmes
Asa P. Wright

Inventors
R. H. Utz and
H. F. Grahl,
By O'Meara & Brock, Attorneys

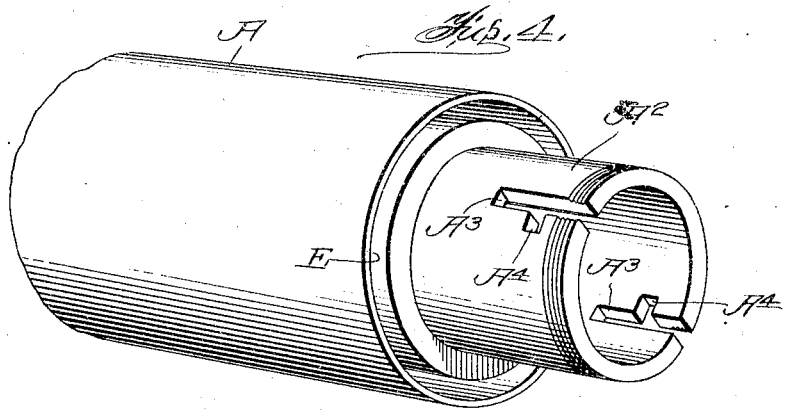
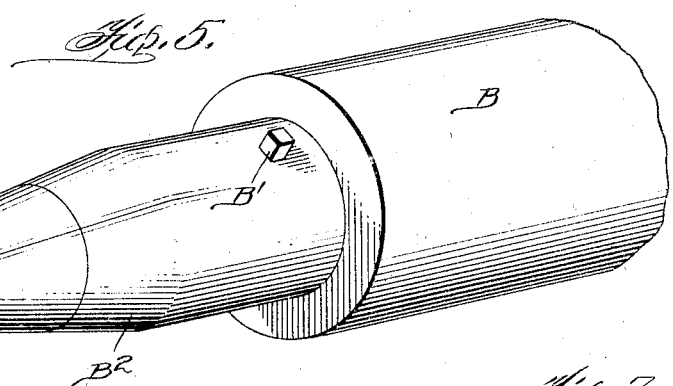
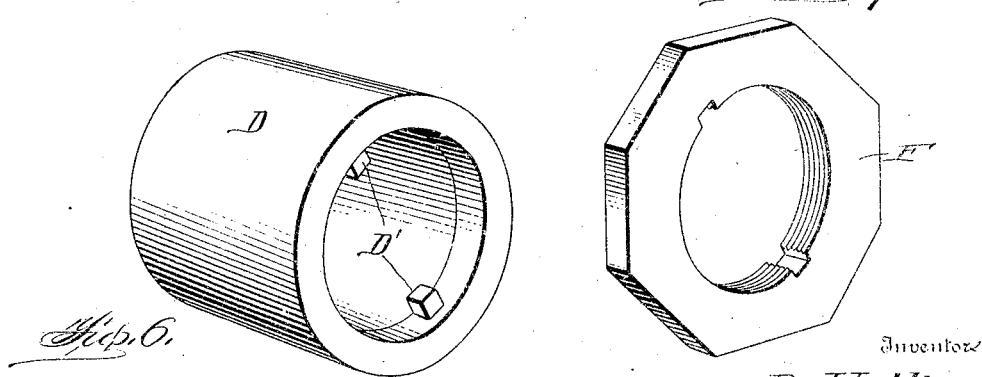

UNITED STATES PATENT OFFICE.

RAYMOND HARRY UTZ AND HERMAN FREDRICK GRAHL, OF THE UNITED STATES NAVY.

HOSE-COUPLING.

1,011,284.  Specification of Letters Patent.  Patented Dec. 12, 1911.

Application filed August 16, 1909. Serial No. 513,100.

*To all whom it may concern:*

Be it known that we, RAYMOND H. UTZ and HERMAN F. GRAHL, citizens of the United States, serving in the United States Navy on the U. S. S. *Cleveland*, have invented a new and useful Improvement in Hose-Couplings, of which the following is a specification.

This invention relates to hose couplings, and more particularly to detachable hose couplings, the object being to provide a hose coupling which is so constructed that it can be easily and quickly coupled and uncoupled.

Another object of our invention is to provide a hose coupling which is formed of a male and female member adapted to be locked together in such a manner that all danger of the members becoming separated accidentally is prevented.

A further object of the invention is to provide the female member with bayonet slots in which are adapted to fit lugs carried by the male member, said lugs being locked therein by a spring actuated sleeve carrying oppositely disposed lugs which are normally held in the path of the lugs of the female member so that after they are once in position it will be impossible for the same to move without moving the spring actuated sleeve.

Another object of our invention is to provide a locking nut in connection with the device whereby the movement of the spring actuated sleeve can be controlled.

A still further object of the invention is to provide the conical socket of the female member with a rubber washer which is so mounted that it can be easily and quickly attached or detached so that when the same becomes worn, it can be readily replaced.

Still another object of our invention is to provide the male member with a detachable neck having a conical end adapted to fit within the conical socket of the female member against the rubber washer, said neck being so mounted that it can be easily and quickly detached when desired.

Figure 1:
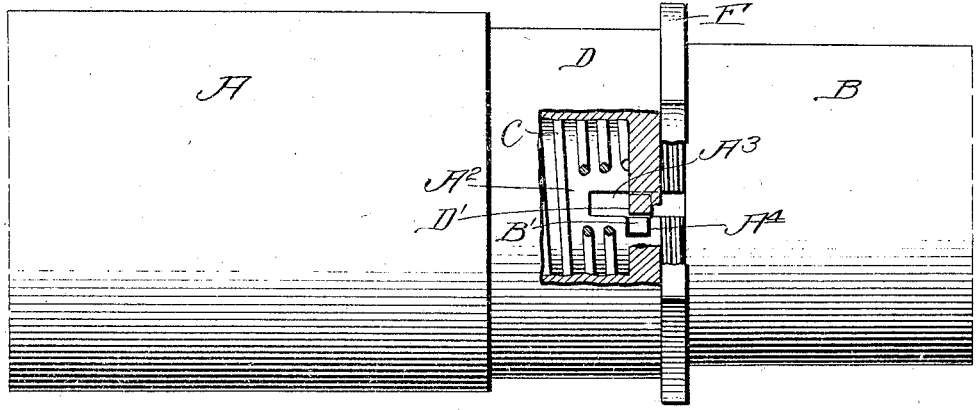
Figure 2:
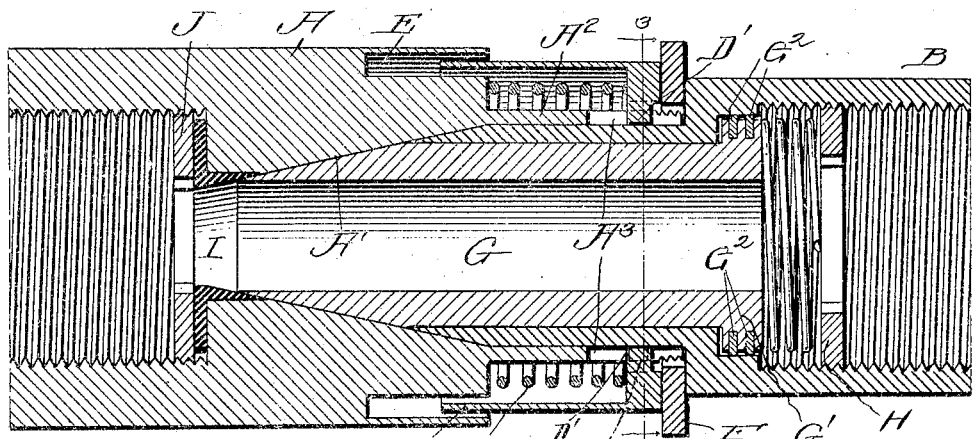
Figure 3:
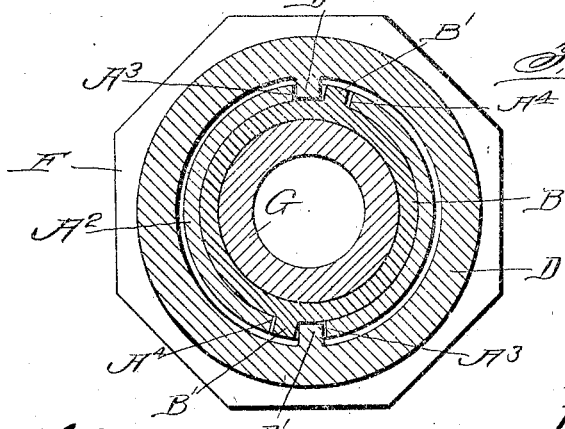

With these various objects in view, our invention consists in the novel features of construction, arrangement and combination of parts hereinafter fully described, pointed out in the claims, and shown in the accompanying drawings, in which:

Figure 1 is a top plan view of our improved coupler, partly broken away to show the position of the lugs within the slot when in a locked position. Fig. 2 is a longitudinal sectional view. Fig. 3 is a section taken on the line 3—3 of Fig. 2. Fig. 4 is a perspective view of the female member, the spring sleeve and lock nut being removed. Fig. 5 is a perspective view of the male member. Fig. 6 is a perspective view of the spring actuated sleeve carrying the lugs, and Fig. 7 is a perspective view of the locking nut.

Referring to the drawings A indicates a female member and B a male member, each of which is provided with a threaded bore to which the respective ends of the hose to be coupled are adapted to be connected in the ordinary manner. The female member A is provided with a socket $A'$ terminating in a sleeve portion $A^2$ which is provided with oppositely disposed longitudinal slots $A^3$ having notched walls $A^4$ forming substantially bayonet shaped slots in which the oppositely disposed lugs $B'$ of the contracted sleeve portion of the male member B are adapted to fit so as to lock the same therein, the member B being partly rotated after the sleeve $B^2$ has entered the socket $A'$.

Mounted on the sleeve portion of the female member is a coil spring C which bears against an annular flange of a sleeve D which extends into an annular groove E formed in the body of the female member and is normally held outwardly by the spring, said flange having oppositely disposed lugs $D'$ which fit within the slots of the female member and bear against the sleeve portion of the male member so that when the lugs of the male member are forced into the slot, the lugs of the sleeve will be forced past the notches so as to allow the lugs of the member B to be turned into the same whereby the lugs will be forced outwardly in the slots opposite the notches so that it will be impossible for the same to be detached without first moving the sleeve inwardly. For preventing the sleeve from being forced off the female member, we employ a nut F which works on the extreme threaded end of the sleeve of the female member and is provided with notches adapted to register with the slot so as to allow the lugs of the male member to enter the same and it will be seen that after the lugs have been passed under the same and the nut is turned, the sleeve with the lugs will be held in position opposite the notches by the coil spring so as to prevent the same from coming out.

Arranged within the contracted sleeve portion of the male member is a neck G which is provided with an annular shoulder G' at one end adapted to engage the shoulder formed by the contracted portion of the male member and be securely locked against the same by a nut H working in the threaded bore of the male member. The other end of the neck G is cut away to form a conical portion adapted to fit against the sides of the socket smoothly, the extreme end of the same engaging a rubber washer I which is arranged in an annular seat formed in the lower end of the conical socket of the female member, said washer being locked in position therein by a nut J working in the threaded bore of the female member. By this arrangement, when the washer becomes worn, it is only necessary to unscrew the nut in order that the washer can be removed and a new one inserted. The conical portion of the neck coincides with the conical portion of the sleeve of the male member so that when the parts are in a locked position, a tight joint will be formed between the same and by having the rubber washer arranged at the extreme end an exceedingly efficient water tight joint is formed.

It will be seen that by this construction, the parts are so arranged and connected together that when any one of the same becomes worn, it can be easily and quickly detached and replaced by a new one and by having the nut F of a larger diameter than the members of the coupler it forms a bearing for the same when the hose is being dragged.

The shoulder G' is provided with grooves in which fit packing rings G² which engage the smooth bore portion of the member B and form a tight joint.

The operation of coupling the members is as follows: The nut F being turned so as to bring the notches to register with the slots of the female member, the lugs of the male member are then placed into alinement with the slots and by forcing the members together until the lugs are brought opposite the notches by turning the male member they are forced into the same, it of course being understood that the lugs of the sleeve are forced inwardly by the lugs of the male member and after the lugs have entered the notches, the lugs of the sleeve are forced outwardly by the spring so as to close the mouth of the notches whereby it will be impossible for the members to be detached without first forcing the lugs of the sleeve inwardly. After this has been performed, the nut F is screwed up until the sleeve is brought into the proper position, which insures the locking of the same so that all danger of the members becoming loose is prevented.

Having thus fully described our invention, what we claim as new and desire to secure by Letters Patent, is:—

1. In a hose coupling, the combination with a female member provided with a socket and a sleeve portion having bayonet slots, of a male member provided with a sleeve portion having lugs adapted to be locked within the bayonet slots, a spring actuated sleeve mounted on the sleeve of the female member carrying lugs working in said slot, a nut for limiting the outward movement of said sleeve, and a neck carried by the male member fitting within the socket of the female member.

2. In a hose coupling, the combination with a female member provided with a conical socket, and a sleeve having bayonet slots, of a male member provided with a contracted sleeve portion having a conical end fitting within the conical socket of the female member, oppositely disposed lugs formed on the sleeve of the male member adapted to be interlocked in the bayonet slots of the female member, a spring actuated sleeve carrying lugs working in the bayonet slots of the female member, and a neck carried by the male member provided with a conical end fitting within the conical socket of the female member.

3. A hose coupling comprising a male and a female member, the female member being provided with a conical socket terminating in a sleeve portion having bayonet slots, a sleeve coöperating with the socket, lugs carried by said sleeve, said lugs working in the bayonet slots of the female member, a coil spring arranged to the rear of said lugs under said sleeve, a nut mounted on the sleeve of the female member for limiting the outward movement of said sleeve, a neck carried by the male member fitting within the socket of the female member and engaging the washer carried thereby and lugs formed on the contracted neck portion of the male member adapted to be interlocked within the bayonet slots of the female member.

4. A hose coupling comprising a female member having a conical socket terminating in a sleeve portion having bayonet slots, a male member comprising a body provided with a contracted neck portion having lugs adapted to be interlocked in the bayonet slots, a spring actuated sleeve provided with lugs mounted on the sleeve of the female member working in the bayonet slots, a nut for limiting the outward movement of said sleeve, a neck provided with a conical end arranged within the male member fitting within the socket of the female member, a nut for locking said neck therein, a washer carried by the female member adapted to be engaged by the neck of the male member, and a nut for locking said washer therein.

5. In a hose coupling, the combination with a female member having a conical socket and a sleeve portion provided with a threaded end, of a male member provided with a contracted neck portion arranged in said female member, said sleeve portion being provided with bayonet slots, a sleeve surrounding the neck portion of the male member provided with lugs coacting with said slots, a spring working against said members for holding said lugs in position, a nut working on the threaded sleeve portion of the female member for locking said lugs in position therein, said members being provided with flexible washers for forming a water tight joint.

RAYMOND HARRY UTZ.
 HERMAN FREDRICK GRAHL.

Witnesses:
 GEORGE F. HENRECHON,
 HOWARD LE ROY.